(12) United States Patent
Terui et al.

(10) Patent No.: US 7,071,602 B2
(45) Date of Patent: Jul. 4, 2006

(54) FILTER FOR PLASMA DISPLAY PANEL

(75) Inventors: Hirotoshi Terui, Ichihara (JP); Ken Moriwaki, Ichihara (JP)

(73) Assignee: Asahi Glass Company, Limited, Tokyo (JP)

( * ) Notice: Subject to any disclaimer, the term of this patent is extended or adjusted under 35 U.S.C. 154(b) by 544 days.

(21) Appl. No.: 10/119,839

(22) Filed: Apr. 11, 2002

(65) Prior Publication Data

US 2003/0128172 A1    Jul. 10, 2003

(30) Foreign Application Priority Data

Apr. 27, 2001    (JP) .............................. 2001-131291

(51) Int. Cl.
*H01J 5/16*     (2006.01)
*H01J 61/40*    (2006.01)
*H01K 1/26*     (2006.01)
*H01K 1/30*     (2006.01)

(52) U.S. Cl. ........................................ 313/112; 313/582
(58) Field of Classification Search ................ 313/112, 313/110, 582, 477 R, 478, 524, 580, 476, 313/479, 489; 359/580, 359; 345/63, 77
See application file for complete search history.

(56) References Cited

U.S. PATENT DOCUMENTS

| | | | |
|---|---|---|---|
| 5,225,244 A * | 7/1993 | Aharoni et al. ............. | 427/240 |
| 5,834,122 A | 11/1998 | Teng et al. .................. | 428/412 |
| 5,945,209 A * | 8/1999 | Okazaki et al. ........... | 428/304.4 |
| 6,165,546 A | 12/2000 | Teng et al. ............... | 427/163.1 |
| 6,166,855 A * | 12/2000 | Ikeyama et al. ............ | 359/580 |
| 6,229,252 B1 | 5/2001 | Teng et al. .................. | 313/112 |
| 6,333,592 B1 * | 12/2001 | Sasa et al. .................. | 313/112 |
| 6,344,710 B1 | 2/2002 | Teng et al. .................. | 313/479 |
| 6,452,331 B1 | 9/2002 | Sakurada et al. ........... | 313/582 |
| 6,768,602 B1 | 7/2004 | Teng et al. .................. | 359/885 |
| 6,833,665 B1 | 12/2004 | Wachi et al. ................ | 313/479 |
| 2003/0128172 A1 | 4/2002 | Terui et al. | |
| 2002/0050783 A1 * | 5/2002 | Kubota et al. .............. | 313/495 |

FOREIGN PATENT DOCUMENTS

| | | |
|---|---|---|
| EP | 0 949 648 | 10/1999 |
| EP | 1 008 871 | 6/2000 |
| EP | 1 029 832 | 8/2000 |
| EP | 1 069 088 | 1/2001 |
| EP | 1 124 144 | 8/2001 |
| JP | 60-222249 | 11/1985 |
| JP | 63-238111 | 10/1986 |
| JP | 61-281118 | 12/1986 |

(Continued)

OTHER PUBLICATIONS

U.S. Appl. No. 11/218,588, filed Sep. 6, 2005, Teng et al.

*Primary Examiner*—Joseph Williams
*Assistant Examiner*—Kevin Quarterman
(74) *Attorney, Agent, or Firm*—Oblon, Spivak, McClelland, Maier & Neustadt, P.C.

(57) ABSTRACT

A filter for a plasma display panel provided with an antireflection optical film having a colorant, whereby when red light in a visible light range emitted from the plasma display panel is passed therethrough, a positional relation of a before passage position and an after passage position in a CIE xy chromaticity diagram of the red light, defines compensation for red color emission from the plasma display panel.

23 Claims, 3 Drawing Sheets

FOREIGN PATENT DOCUMENTS

| | | |
|---|---|---|
| JP | 63-18964 | 4/1988 |
| JP | 64-56717 | 3/1989 |
| WO | WO 00/23829 | 4/2000 |
| WO | WO 00/43814 | 7/2000 |

* cited by examiner

EXAMPLE 3 ABSORBANCE

FILTER FOR PLASMA DISPLAY PANEL

DISCUSSION OF THE BACKGROUND

1. Field of the Invention

The present invention relates to a filter for a plasma display panel, which is used as bonded to the main body of the plasma display panel or as disposed in front of the plasma display panel.

2. Background of the Invention

Heretofore, for plasma display panels (hereinafter referred to also as "PDP"), various filters have been used for the purpose of e.g. shielding infrared rays or electromagnetic waves emitted from PDP or preventing reflection of external lights. For example, a filter having an infrared absorbing film, an electrically conductive film, an antireflection film or the like laminated on the front or rear side of a transparent substrate made of e.g. glass, or a filter which can be formed directly on the surface of PDP by laminating an infrared absorbing film, an electrically conductive film, an antireflection film or the like, may be mentioned.

Further, in recent years, it has been proposed to incorporate to the above filter a dye showing absorption in the visible light range, in order to control the color.

SUMMARY OF THE INVENTION

The present inventors have paid an attention to a fact that in red color emission of PDP, both the phosphor itself and the gas emit orange colored unnecessary lights, whereby the color purity deteriorates. Further, the color required in the red color emission of PDP varies depending upon the particular use.

Accordingly, it is an object of the present invention to provide a filter for PDP, to improve the color purity of the red color emission of PDP or to convert the red color emission of PDP to a desired color. Especially, the filter for PDP is preferably excellent in scratch resistance, since it is used as attached to the main body of PDP or as disposed in front of PDP.

The present invention provides:

(1) A filter for a plasma display panel provided with an antireflection optical film having a color correction function, whereby when red light emitted from the plasma display panel is passed therethrough, the positional relation of the position before the passage and the position after the passage in the CIE xy chromaticity diagram of the red light, satisfies at least one of the following formulae (1) and (2) relating to changes in coordinates x,y, and the following formulae (3) and (4) relating to distances from standard values:

Formulae relating to coordinates x,y:

$$\Delta x > 0.003 \quad (1)$$

$$\Delta y < -0.003 \quad (2)$$

where $\Delta x$ is the change in coordinate x, and $\Delta y$ is the change in coordinate y, Formulae relating to distances from standard values:

$$\Delta D(rn) < -0.003 \quad (3)$$

$$\Delta D(rc) < -0.003 \quad (4)$$

where $\Delta D(rn)$ is the change in the distance from a point (x, y)=(0.67, 0.33), and $\Delta D(rc)$ is the change in the distance from a point (x, y)=(0.64, 0.33), and $\Delta D(rn)$ and $\Delta D(rc)$ respectively mean that when they take positive values, the distances become long, and when they take negative values, the distances become short.

(2) The filter for a plasma display panel according to the above (1), wherein the antireflection optical film having a color correction function comprises an antireflection film (A) made of a non-crystalline fluoropolymer and a layer (B) made of a resin having a self-restoring property and a scratch resistant property, and at least one of materials constituting the antireflection optical film having a color correction function contains a color correcting agent.

(3) The filter for a plasma display panel according to the above (2), wherein at least the layer (B) contains a color correcting agent.

(4) The filter for a plasma display panel according to the above (2) or (3), wherein in the antireflection optical film having a color correction function, the film (A) and the layer (B) are laminated directly or with a layer (C1) having a thickness of at most 10 μm interposed between them.

(5) The filter for a plasma display panel according to any one of-the above (2) to (4), wherein in the antireflection optical film having a color correction function, at least one resin layer (C2) is provided on the side of the layer (B) where the film (A) is not present.

(6) The filter for a plasma display panel according to the above (5), wherein at least one resin layer (C2) is a constituting material which contains a color correcting agent.

(7) The filter for a plasma display panel according to any one of the above (2) to (6), wherein a layer (C3) of a tackiness or adhesive agent is provided as the outermost layer on the side of the layer (B) where the film (A) is not present.

(8) The filter for a plasma display panel according to the above (7), wherein at least the layer (C3) is a constituting material which contains a color correcting agent.

(9) The filter for a plasma display panel according to any one of the above (1) to (8), which has the main absorption peak in the visible light range within a range of from 570 to 610 nm.

(10) The filter for a plasma display panel according to the above (9), wherein the half-value width of the main absorption peak in the absorbance curve is at most 35 nm.

(11) The filter for a plasma display panel according to the above (9) or (10), which has the subordinate absorption peak in the visible light range within a range of from 500 to 570 nm.

(12) A process for producing the filter for a plasma display panel as defined in the above (2), which comprises preparing a layer (B) made of a resin having a self-restoring property and a scratch resistant property, and forming, on the surface of the layer (B), an antireflection film (A) made of a non-crystalline fluoropolymer.

DETAILED DESCRIPTION OF THE PREFERRED EMBODIMENTS

Figure 1:
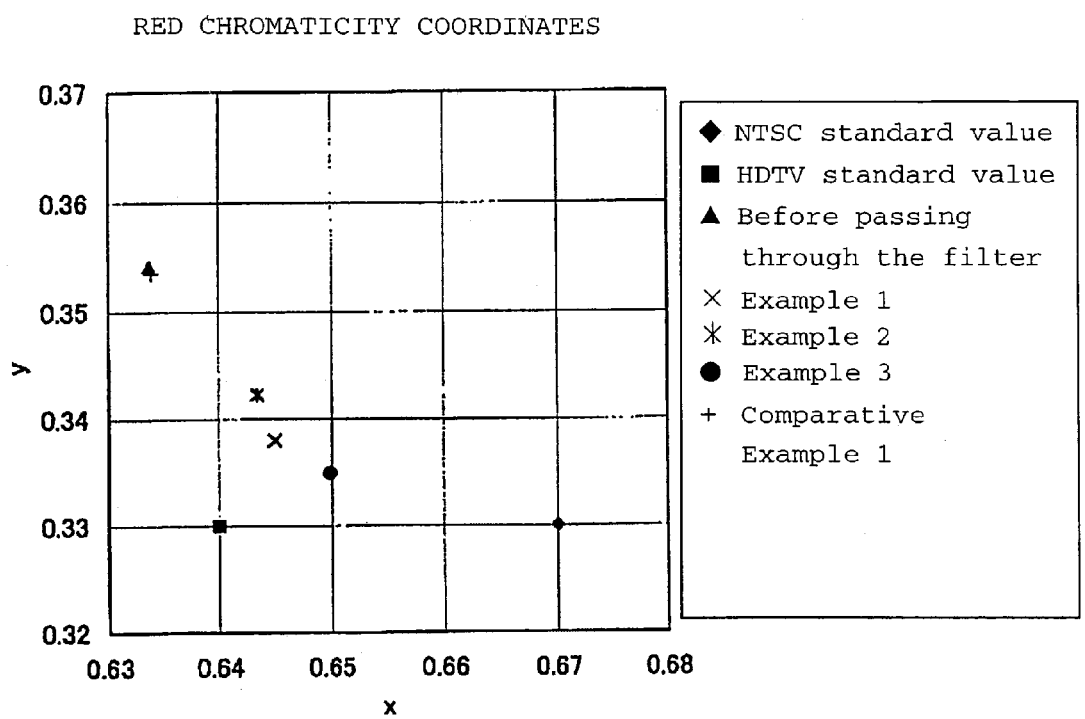
FIG. 1 is a xy chromaticity diagram showing the positions of red light in cases where the filters for PDP in Examples of the present invention and Comparative Examples were attached to PDP.

Now, the present invention will be described in detail with reference to the drawings.

The present invention is directed to a filter for PDP provided with an antireflection optical film having a color correction function, whereby when red light emitted from PDP is passed therethrough, the positional relation of the position before the passage and the position after the passage in the CIE xy chromaticity diagram (hereinafter sometimes referred to simply as "xy chromaticity diagram") of the red light, changes to satisfy at least one of the following formulae (1) to (4):

$$\Delta x > 0.003 \quad (1)$$

$$\Delta y < -0.003 \quad (2)$$

$$\Delta D(rn) < -0.003 \quad (3)$$

$$\Delta D(rc) < -0.003 \quad (4)$$

It is particularly preferred to change the positional relation to satisfy at least one of the following formulae (1') to (4'):

$$\Delta x > 0.005 \quad (1')$$

$$\Delta y < -0.005 \quad (2')$$

$$\Delta D(rn) < -0.005 \quad (3')$$

$$\Delta D(rc) < -0.005 \quad (4')$$

FIG. 1 is a xy chromaticity diagram showing one embodiment of the positions of red light in cases where the filters for PDP in Examples and Comparative Examples given hereinafter, were attached to PDP.

In FIG. 1, in a case where no filter was employed, the red light emitted from PDP is located at (x, y)=(0.6336, 0.3542). Whereas, in a case where the filter for PDP of the present invention was employed, the red light after passing through the filter is located, for example, at (x, y)=(0.6450, 0.3380).

Accordingly, in this case, when the change in coordinate x is represented by $\Delta x$, and the change in coordinate y is represented by $\Delta y$, $\Delta x=0.0114$, and $\Delta y=-0.0162$, thus satisfying the formulae (1) and (2) relating to changes in coordinates x,y.

In the red light emission of PDP, both the phosphor itself and the gas emit orange colored unnecessary lights, whereby, as compared with the original color, coordinate x tends to be small, and coordinate y tends to be large. However, by using the filter for PDP of the present invention, coordinate x may be made larger than the prescribed level or coordinate y may be made smaller than the prescribed level, or preferably both may be made simultaneously, whereby the purity of red light can be made high.

Further, when the change in the distance from a point (x, y)=(0.67, 0.33) is represented by $\Delta D(rn)$, and the change in the distance from a point (x, y)=(0.64, 0.33) is represented by $\Delta D(rc)$, $\Delta D(rn)=-0.0175$, and $\Delta D(rc)=-0.0156$, thus satisfying the formulae (3) and (4) relating to distances from standard values.

For PDP, the color required varies depending upon the particular use, but the NTSC (National Television System Committee) standard value and the standard value of CRT (HDTV standard value) are used as common indices, respectively. Accordingly, there is a substantial demand for a filter for PDP which is capable of adjusting the color of light emitted from PDP to take values close to these standard values.

When the filter for PDP of the present invention is employed, $\Delta D(rn)$ and/or $\Delta D(rc)$ takes a negative value. Namely, the distances from the NTSC standard value i.e. a point (x, y)=(0.67, 0.33) and/or the HDTV standard value i.e. a point (x, y)=(0.64, 0.33) become short. Also from FIG. 1, it is evident that the red light approaches these standard values for at least a certain distance, when it passes through the filter for PDP of the present invention.

The construction of the filter for PDP of the present invention is not particularly limited, so long as it is provided with an antireflection optical film having a color correction function. However, it is preferred that the antireflection optical film having a color correction function, comprises an antireflection film (A) made of a non-crystalline fluoropolymer and a layer (B) made of a resin having a self-restoring property and a scratch resistant property.

The antireflection film (A) to be used for the filter for PDP of the present invention is made of a non-crystalline fluoropolymer.

The non-crystalline fluoropolymer may, for example, be a three component copolymer of tetrafluoroethylene, vinylidene fluoride and hexafluoropropylene, or a polymer having fluoroalicyclic structures. A polymer having fluoroalicyclic structures is particularly preferred, since it is excellent in mechanical properties.

The polymer having fluoroalicyclic structures may preferably be one obtainable by polymerizing a monomer having a fluoroalicyclic structure (JP-B-63-18964, etc.) or a polymer having cyclic structures in its main chain, obtainable by cyclic polymerization of a fluoromonomer having at least two polymerizable double bonds (JP-A-63-238111, etc.).

The antireflection film is required to be one which does not substantially hinder the self-restoring property and the scratch resistant property of the layer (B) made of a resin having a self-restoring property and a scratch resistant property, which will be described hereinafter. For this purpose, the thickness of the antireflection film is preferably from 10 to 1,000 nm, more preferably from 20 to 500 nm.

The layer (B) made of a resin having a self-restoring property and a scratch resistant property, is not particularly limited, but is preferably a layer made of a polyurethane resin. A polyurethane resin having a self-restoring property and a scratch resistant property (hereinafter referred to also as "a polyurethane resin (b)") is known (JP-A-60-222249, JP-A-61-281118, etc.).

The polyurethane resin (b) which is transparent and has a self-restoring property and a scratch resistant property, may be any one of a thermosetting polyurethane resin, an UV-curable polyurethane resin and a thermoplastic polyurethane elastomer (TPU).

The thermosetting polyurethane resin is a polyurethane resin which is obtainable by using, among reactive main materials comprising a polyfunctional active hydrogen compound (a polyol) and a polyisocyanate, a tri- or higher functional compound as at least a part of at least one of the main materials.

The thermoplastic polyurethane elastomer is a polyurethane elastomer obtainable by using materials which are all bi-functional.

The polyurethane resin (b) is preferably a thermosetting polyurethane resin from the viewpoint of chemical resistance, antifouling property and durability. Now, the thermosetting polyurethane resin will be described.

As the polyfunctional active hydrogen compound, a polyol is preferred. For example, a polyether polyol, a polyester polyol or a polycarbonate polyol may be employed. From the viewpoint of the balance of durability, price, strength and scratch resistance, and self-restoring property, a polyester polyol is preferred. Especially, a cyclic ester, particularly a polyester polyol obtainable by ring-opening of a caprolacton, is preferred.

The number of functional groups of the polyol is required to be larger than 1 as an average value, and is preferably from 2 to 3 from the viewpoint of the balance of strength, elongation, self-restoring property and scratch resistance, The polyol is preferably a triol only (which may be a mixture of two or more triols) or a mixture of a triol and a diol. The hydroxyl value of each polyol is not particularly limited, but the average hydroxyl value of the total polyol is preferably from 100 to 600 mg-KOH/g, more preferably from 200 to 500 mg-KOH/g. This polyol may contain a chain extender which is a short chain polyol. Further, in a case where the polyol contains such a chain extender, the above average hydroxyl value is an average hydroxyl value calculated to include such a chain extender.

As such a useful chain extender, a short chain polyol or a short chain polyamine may, for example, be mentioned. From the viewpoint of transparency, flexibility and reactivity, a short chain polyol is particularly preferred, and a short chain diol is more preferred.

The polyisocyanate is preferably a non-yellowing polyisocyanate from the viewpoint of the resistance against yellowing of the polyurethane resin (b) thereby obtained. The non-yellowing polyisocyanate is non-aromatic or aromatic polyisocyanate having no isocyanate group directly bonded to the aromatic nucleus. An aliphatic or alicyclic diisocyanate, or a tri- or higher functional polyisocyanate, is particularly preferred. Especially, a tri- or higher functional polyisocyanate, or a mixture of such a polyisocyanate and a diisocyanate, is preferred.

The diisocyanate may, for example, be hexamethylene diisocyanate, isophorone diisocyanate, or hydrogenated diphenylmethane diisocyanate.

The tri- or higher functional polyisocyanate may, for example, be a nulate-modified product or a biuret modified product of diisocyanate, or an urethane modified product modified by a trihydric alcohol such as trimethylolpropane.

These materials may be used alone or in combination as a mixture. Further, a stabilizer such as an ultraviolet absorber, an antioxidant or a photostabilizer, or an additive such as an urethane-forming catalyst, a coloring agent, a flame retardant, an antistatic agent, a surfactant or a silane coupling agent, may be added as the case requires.

As a method for forming a film of the polyurethane resin (b), an extrusion method, an injection molding method, a blow molding method, a casting method or a calender forming method may, for example, be employed. From the viewpoint of the optical quality of the film or from the viewpoint that even a thermosetting resin can be formed, and the heating temperature for forming is low, one obtainable by a reaction casting method as disclosed in JP-A-1-56717, is most preferred.

The reaction casting method is a method wherein a flowable mixture of reactive materials, which forms a soft synthetic resin upon reaction, is reacted, while it is cast on a flat carrier having a releasing or non-releasing property, to form a film of a soft synthetic resin, and in the case of the releasing carrier, it is then released from the carrier to obtain a film. Usually, a solvent may be contained in the reactive materials when the reaction casting method is carried out, but in the case of preparation of a film of the polyurethane resin (b), a method employing reactive materials containing substantially no solvent, i.e. the reaction bulk casting method, is preferred.

In the present invention, "the polyurethane resin (b) has a self-restoring property" means that "the maximum load where a scratch mark formed by a diamond chip having a forward end diameter of 15 μm as a scratching member in an atmosphere of relative humidity of 50% at 23° C., disappears, is at least 10 g as a value measured by means of a HEIDON scratch tester".

Further, "has a scratch resistant property" means "the maximum load where no permanent scratch is formed by a diamond chip having a forward end diameter of 15 μm as a scratching member in an atmosphere of relative humidity of 50% at 23° C., is at least 10 g as a value measured by means of a HEIDON scratch tester (scratching method)". Otherwise, it may be evaluated on the basis that "the increase in haze measured by a haze meter between before and after 100 rotations under a load of 500 g by a Taber abrasion test employing two CS-10F abrading rings in an atmosphere of relative humidity of 50% at 23° C., is less than 10% (haze meter method)".

The thickness of the layer of the polyurethane resin (b) is preferably from 0.05 to 0.5 mm, particularly preferably from 0.1 to 0.3 mm, from the viewpoint of the self-restoring property and the scratch resistant property. In the antireflection optical film to be used for the filter for PDP of the present invention, it is preferred that at least one of the constituting materials contains a color correcting agent.

The color correcting agent is a colorant such as a pigment or a dye to be used to obtain the desired color. In the present invention, it is preferred to use two or more colorants in combination. As the color correcting agent, an organic pigment is preferred, and a combination of two or more organic pigments, or a combination of an organic pigment and a dye, is preferably employed. The organic pigment may, for example, be a phthalocyanine type pigment, an azo type pigment, a quinacridon type pigment, a perylene type pigment, an isoindolinone type pigment or a quinophthalone type pigment. The dye may, for example, be a cyanine type dye, a porphyrin type dye or a metal complex type dye.

The constituting material which contains the color correcting agent, is not particularly limited. For example, an antireflection film (A) made of a non-crystalline fluoropolymer, a layer (B) made of a resin having a self-restoring property and a scratch resistant property, or any other layer provided as the case requires, may be mentioned. The color correcting agent may be contained in one or more constituting materials among them.

In a case where no other layer is provided, it is particularly preferred that at least the above layer (B) contains a color correcting agent.

The content of the color correcting agent is suitably determined depending upon the required color correcting ability, the type of the color correcting agent to be used, the thickness of the layer containing the color correcting agent, etc.

In a case where the color correcting agent is incorporated to the layer (B) made of a resin having a self-restoring property and a scratch resistant property, it is preferably contained in an amount of from 0.0001 to 0.5 part by mass, more preferably from 0.001 to 0.2 part by mass, per 100 parts by mass of the resin content.

In the filter for PDP of the present invention, it is one of preferred embodiments that in the antireflection optical film having a color correcting function, the film (A) and the layer (B) are laminated directly or with a layer (C1) having a thickness of at most 10 µm interposed therebetween.

Figure 2:
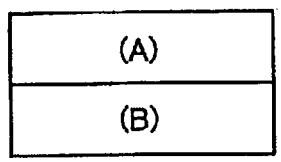
FIG. 2 is a cross-sectional schematic view of one embodiment of the antireflection optical film to be used for the filter for PDP of the present invention.
Figure 3:
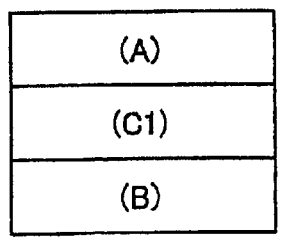
FIG. 3 is a cross-sectional schematic view of another embodiment of the antireflection optical film to be used for the filter for PDP of the present invention.

FIGS. 2 and 3 are cross-sectional views showing preferred embodiments of the antireflection optical film to be used for the filter for PDP of the present invention.

In FIG. 2, the film (A) and the layer (B) are laminated directly.

In FIG. 3, the film (A) and the layer (B) are laminated with a layer (C1) having a thickness of at most 10 µm interposed therebetween.

The layer (C1) is preferably a layer (hereinafter referred to also as "a high refractive index layer") made of a resin having a refractive index higher than the layer (B) made of a resin having a self-restoring property and a scratch resistant property. In such a case, it is possible to obtain a better antireflection effect.

As the resin having a high refractive index, a polymer having aromatic rings in its main chain or side chain, may preferably be employed, such as polystyrene, poly(o-chlorostyrene), poly(2,6-dichlorostyrene), poly(bromostyrene), poly(2,6-dibromostyrene), polycarbonate, an aromatic polyester, polysulfone, polyethersulfone, polyarylsulfone, poly(pentabromophenyl methacrylate), a phenoxy resin or its bromide, or an epoxy resin or its bromide. Further, by modifying the terminal of such a resin to be a reactive functional group, it is possible to increase the adhesion to the antireflection film or to the layer made of a resin having a self-restoring property and a scratch resistant property.

Among these resins, a phenoxy resin, an epoxy resin or the like already has an active functional group at the terminal without modification and thus is preferred from the viewpoint of the adhesive property. A sulfone type polymer such as polysulfone, polyethersulfone or polyarylsulfone is a polymer having sulfur atoms in its main chain.

The thickness of the layer (C1) is at most 10 µm. When the thickness is at most 10 µm, the antireflection performance can be maintained at a higher level. The thickness of the layer (C1) is preferably at most 1 µm, more preferably at most 500 nm.

Further, the thickness of the layer (C1) is preferably at least 10 nm, more preferably at least 20 nm, in order to maintain the antireflection performance at a higher level.

Further, in the filter for PDP of the present invention, it is one of preferred embodiments that in the antireflection optical film having a color correction function, at least one resin layer (C2) is provided on the side of the layer (B) where the film (A) is not present.

Figure 4:
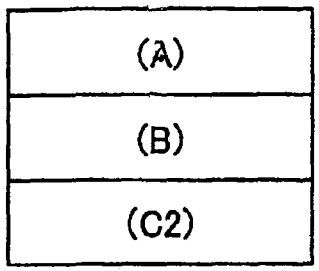
FIG. 4 is a cross-sectional schematic view of still another embodiment of the antireflection optical film to be used for the filter for PDP of the present invention.

FIG. 4 is a cross-sectional view showing a preferred embodiment of the antireflection optical film to be used for the filter for PDP of the present invention.

In FIG. 4, the film (A) and the layer (B) are laminated directly, and one resin layer (C2) is provided on the side of the layer (B) where the film (A) is not present.

One of roles of the resin layer (C2) is a role as a layer containing a color correcting agent. For example, in a case where it is difficult to incorporate a color correcting agent to the film (A), the layer (B) and the layer (C1), it is possible to provide a resin layer (C2) containing a color correcting agent as a color correction layer. Further, the resin layer (C2) may have an electromagnetic wave-shielding property as a layer of an electrically conductive film, which will be described hereinafter.

Such a resin layer (C2) is not particularly limited, so long as it is transparent, but it is preferably made of a thermoplastic acrylic resin, or a thermoplastic polyurethane elastomer.

As the method for forming the resin layer (C2), a method such as extrusion or solution casting may be used. From the viewpoint that a thin film can be formed, a solution casting method is preferred. As a solvent to dissolve the synthetic resin to be used for the solution casting method, a ketone type solvent such as cyclohexanone, an ether type solvent, an ester type solvent such as butyl acetate, an ether alcohol type solvent such as ethylcellosolve, a ketone alcohol type solvent such as diacetone alcohol, or an aromatic solvent such as toluene, may, for example, be mentioned. These solvents may be used alone or in combination as a mixture of a plurality of them.

The thickness of the resin layer (C2) is preferably from 1 to 50 µm, more preferably from 2 to 20 µm, in the case of the solution casting method.

Further, a film to be used as a carrier when a solution of a synthetic resin or the polyurethane resin (b) is cast, may be contained as it is, as the resin layer (C2). However, in such a case, the film is required to be a transparent resin film. The thickness of the transparent resin film is preferably from 10 to 200 µm. Further, the resin layer (C2) may be composed of two or more layers. For example, it may be composed of two layers i.e. the above-mentioned layer containing a color correcting agent and the resin layer used as a carrier.

In a case where the filter for PDP of the present invention has the resin layer (C2), it is one of preferred embodiments that at least one layer of the above layer (C2) contains a color correcting agent.

As the color correcting agent, the same as those described above may be employed.

The content of the color correcting agent may vary depending upon the thickness of the resin layer (C2) and the required color correcting ability, but it is, for example, preferably from 0.001 to 50 parts by mass, more preferably from 0.01 to 20 parts by mass, per 100 parts by mass of the resin content.

Further, in the filter for PDP of the present invention, it is one of preferred embodiment that a layer (C3) of a tackiness or adhesive agent is provided as the outermost layer on the side of the layer (B) where the film (A) is not present.

Figure 5:
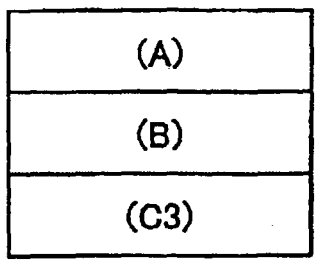
FIG. 5 is a cross-sectional schematic view of an embodiment of the filter for PDP of the present invention.

FIG. 5 is a cross-sectional view showing a preferred embodiment of the antireflection optical film to be used for the filter for PDP of the present invention.

In FIG. 5, the film (A) and the layer (B) are laminated directly, and a layer (C3) of an adhesive agent is provided as the outermost layer on the side of the layer (B) where the film (A) is not present. When the layer (C3) of the tackiness or adhesive agent is provided, the filter-for PDP of the present invention can be bonded to the front side of the main body of PDP.

The tackiness or adhesive agent constituting the layer (C3) is not particularly limited, so long as it is transparent.

As the tackiness agent, an acrylic type tackiness agent, a silicone type tackiness agent or a polyester type tackiness agent, may, for example, be employed.

As the adhesive agent, an acrylic type adhesive agent, an epoxy type adhesive agent, a urethane type adhesive agent, a hot melt type adhesive agent or an ultraviolet curable type adhesive agent, may, for example, be employed.

The thickness of the layer (C3) is preferably from 1 to 100 μm, more preferably from 10 to 50 μm.

In a case where the filter for PDP of the present invention has the layer (C3) of the tackiness or adhesive agent, it is one of preferred embodiments that at least the layer (C3) contains a color correcting agent.

The color correcting agent may be the same as those described above.

The content of the color correcting agent varies depending upon the thickness of the layer (C3) of the tackiness or adhesive agent, or the required color-correcting ability. However, it is preferably from 0.001 to 10 parts by mass, more preferably from 0.01 to 5 parts by mass, per 100 parts by mass of the tackiness or adhesive agent component.

Further, the filter for PDP of the present invention may be one having an electrically conductive film further laminated on the above construction.

The conductive film to be used in the present invention may, for example, be a mesh film or a metal transparent conductive film.

The mesh film is not particularly limited, and it may, for example, be a mesh film obtainable by lithography such as photolithography, or a fiber mesh film.

The metal transparent conductive film may, for example, be a transparent thin metal film, or one having a transparent thin metal film laminated on a transparent resin film. Specifically, an Ag sputtered film or an ITO (oxide of In and Sn) vapor-deposited film, may be mentioned.

In the present invention, other than the mesh film or the metal transparent conductive film, one capable of substantially shielding electromagnetic waves, can be used as the electrically conductive film.

Among them, a mesh film is preferred. Particularly preferred is a mesh film obtainable by photolithography (hereinafter referred to also as "a photolithomesh"). For the film to be used as directly bonded to the main body of PDP, a high level of electromagnetic shielding property is required by the filter disposing system. However, the photolithomesh has a surface resistance as small as about 0.05 Ω/□ and thus is excellent in the electromagnetic shielding property. Here, for example, an Ag sputtered film has a surface resistance of about 1.5 Ω/□ at the minimum.

The photolithomesh is composed of a metal mesh and a resin film. The photolithomesh is prepared, for example, by laminating a metal foil and a resin film by means of e.g. an adhesive, coating a photosensitive resist on the metal foil surface, followed by exposure, development and etching treatment, to peel the resist, or subsequently, protecting the metal mesh surface with a protective layer, as the case requires.

The specification of the photolithomesh is preferably such that the pitch is from 200 to 400 μm, and the line width is from 5 to 30 μm.

In the mesh film, it is preferred that a transparent resin is filled in the spaces of the mesh, whereby the opaque mesh will be made transparent, and the mesh film surface will be made smooth and flat. Like this, when an opaque mesh is to be used, it is preferred to coat the mesh surface with a protective layer made of a transparent resin and to fill the resin in mesh spaces to make the mesh to be transparent. Further, in a case where a mesh film having the mesh surface not protected, is employed, when the mesh film is bonded to another layer, a transparent adhesive may be used to fill the spaces of the mesh to make the mesh to be transparent.

The thickness of the mesh film is preferably from 80 to 400 μm in total. The thickness of the mesh is preferably from 5 to 30 μm, and the thickness of the resin film is preferably from 50 to 300 μm.

The metal to be used as a constituting material of the electrically conductive film may, for example, be copper, aluminum, nickel, titanium, tungsten, tin, lead, iron, silver or chromium, or an alloy thereof such as stainless steel. Among them, copper, stainless steel or aluminum is preferred.

The resin to be used as a constituting material of the electrically conductive film may, for example, be polyethylene terephthalate (PET), polybutylene terephthalate, polymethyl methacrylate (PMMA), an acrylic resin, polycarbonate (PC), polystyrene, cellulose triacetate, polyvinyl alcohol, polyvinyl chloride, polyvinylidene chloride, polyethylene, an ethylene/vinyl acetate copolymer, polyvinyl butyral, a metal ion crosslinked ethylene/methacrylic acid copolymer, polyurethane or cellophane. Among them, PET, PMMA or PC is preferred.

The filter for PDP of the present invention can be used as directly bonded to the display surface of the main body of PDP. Further, it may be used as a filter to be disposed in front of the display surface of the main body of PDP with a distance from the display surface. In the case of the latter filter, it is required to be self-supporting. Accordingly, it is common to employ a self-supporting transparent substrate with the above-mentioned antireflection optical film bonded thereto. The filter for PDP of the present invention may have such a construction containing such a substrate. The substrate may, for example, be a glass plate or a transparent plastic plate (such as an acrylic resin plate). Particularly preferred is a glass plate. Further, a substrate having an electrically conductive layer may also be used. For example, a glass plate having a thin metal film or an electrically conductive thin metal oxide film, may be employed as the substrate.

When the above antireflection optical film is to be bonded to the substrate, it may be bonded to one side of the substrate or both sides of the substrate. In a case where it is bonded to one side of the substrate, a film other than the antireflection optical film in the present invention, may be bonded on the other side. For example, an antireflection film (having no color correcting function) having the above-mentioned layer (B) and the layer (A), may be bonded. This antireflection film may have a layer of a resin having a high refractive index or a layer of a tackiness or adhesive agent, in the same manner as described above.

The-filter for PDP of the present invention is a filter for PDP whereby the red color emission of PDP is changed to have a higher purity or to be closer to the prescribed standard values, and it preferably takes the above-described construction. Its optical characteristics are preferably as follows.

Namely, the filter for PDP of the present invention preferably has the main absorption peak in the visible light range within a range of from 570 to 610 nm.

In the red color emission of PDP, both the phosphor itself and the gas emit orange colored unnecessary lights, and such unnecessary lights have peaks in the vicinity of 590 nm. Accordingly, if the filter for PDP of the present invention is adjusted to have the main absorption peak in the visible light range within a range of from 570 to 610 nm, it is possible to remove such unnecessary lights without giving any substantial effect to other colors. To let the filter have the main absorption peak in the visible light range within a range of from 570 to 610 nm, a method may, for example, be adopted wherein the color correcting agent having an absorption peak within the above range, is incorporated in at least one of the above-described constituting materials of the antireflection optical film.

It is particularly preferred that the half-value width of the above-mentioned absorption peak in the absorbance curve is at most 35 nm. By making the main absorption peak sharp, the influence over other colors can be reduced.

Further, the filter for PDP of the present invention preferably has the subordinate absorption peak in the visible light range within a range of from 500 to 570 nm. If the filter for PDP of the present invention is adjusted to have the subordinate absorption peak in the visible light range within a range of from 500 to 570 nm, the white balance will be good, and the antireflection performance will also be improved.

Here, in the present invention, "the subordinate absorption peak in the visible light range" means a peak in the visible light range where the absorbance is smaller than "the main absorption peak in the visible light range".

In order to let the filter have the subordinate peak in the visible light range within a range of from 500 to 570 nm, a method may, for example, be adopted wherein a color correcting agent having an absorption peak within the above range is incorporated in at least one of the above-described constituting materials of the antireflection optical film. In such a case, the color correcting agent may be incorporated to the same constituting material as the color correcting agent to develop the main absorption peak, or to a constituting material different therefrom.

The method for producing the antireflection optical film to be used in the present invention is not particularly limited. However, it may, for example, be produced by the following method.

Firstly, the layer (B) made of a resin having a self-restoring property and a scratch resistant property, such as a film composed of a single layer of a polyurethane resin (b), is produced.

The starting material for the polyurethane resin (b) is cast on a smooth carrier and formed into a film by a reaction casting method. Thereafter, the carrier is peeled off to obtain a film composed of a single layer of the polyurethane resin (b).

The carrier is not particularly limited, so long as it is excellent in smoothness and has strength durable against processing. However, in view of common availability, etc., it is preferably a polyester film, an oriented polypropylene film or the like.

Now, in a case where the antireflection optical film to be used in the present invention has a resin layer (C2) in addition to the layer (B) made of a resin having a self-restoring property and a scratch resistant property, laminates can be obtained by the following methods.

(a) A method in which a solution of a resin is cast on a carrier, and the solvent is removed by drying to obtain a film of the resin, whereupon the starting material for a polyurethane resin (b) is reaction-cast thereon and heated and cured.

(b) A method wherein a solution of a resin is cast on a carrier, and the solvent is removed by drying to obtain a film of the resin, whereupon a film of a polyurethane resin (b) previously obtained by a reaction casting method on another carrier, is laminated thereon by means of a tackiness agent or the like.

(c) A method wherein a film of a resin is obtained by an extrusion method, and then the starting material for a polyurethane resin (b) is reaction-cast thereon and heated and cured.

(d) A method wherein a film of a resin is obtained by an extrusion method, and then, a film of a polyurethane resin (b) preliminarily obtained by a reaction casting method on a carrier, is laminated by means of a tackiness agent or the like.

In the above methods (b) and (d), the carrier to be used for forming the film of the polyurethane resin (b), may be peeled off, followed by lamination with a resin film. Otherwise, after the lamination, it may be peeled off. Otherwise, while maintaining the carrier, the carrier surface and the resin layer (C2) may be laminated by e.g. a tackiness agent.

In the above methods (a) and (b), the surface which is in contact with the film of the polyurethane resin (b) directly or via the tackiness agent, may be the surface of a carrier, or a surface of a resin film. When a film of a resin is in contact, after the lamination with the film of the polyurethane resin (b), the carrier located on the opposite side may be peeled off from the resin film, or may be used as it is without being peeled off.

The carrier to be used for the preparation of the film of the polyurethane resin (b) or the film of the resin, is not particularly limited so long as it is excellent in smoothness and has strength durable against processing. However, from the viewpoint of a wide range of applications, a polyester film, an oriented polypropylene film or the like is preferred.

Especially, the carrier for casting the resin layer (C2) not only provides a function as a carrier but also performs a role as a reinforcing material in a case where the resin layer (C2) which is too thin to be handled alone, is laminated with the film of the polyurethane resin (b).

Further, in a case where the film used as a carrier is contained as a part of the laminate, as mentioned above, such a film is required to be a transparent resin film. The thickness of such a transparent resin film is preferably from 0.01 to 0.2 mm.

Further, the laminate to be used in the present invention is required to have a layer (B) made of a resin having a self-restoring property and a scratch resistant property, such as a surface of the polyurethane resin (b), at least on one side. The total thickness of the film made of the laminate is preferably from 0.1 to 0.5 mm. Further, an antireflection film (A) made of a noncrystalline fluoropolymer is formed on a film made of a single layer of the layer (B) made of a resin having a self-restoring property and a scratch resistant property or on the surface of the layer (B) of a laminate which further has the resin layer (C2), obtained as described above.

Otherwise, after forming a layer (C1) on the surface of the layer (B), an antireflection film (A) is formed on the surface of the layer (C1).

The method for forming the antireflection film (A) is not particularly limited, and any suitable processing method may be selected for use. For example, a polymer having fluoroalicyclic structures is soluble in a fluorine type solvent such as perfluorooctane, $CF_3(CF_2)_nCH\!=\!CH_2$ (wherein n is an integer of from 5 to 11) or $CF_3(CF_2)_mCH_2CH_3$ (wherein m is an integer of from 5 to 11), and by coating a solution of this polymer, an antireflection film (A) having a prescribed thickness can readily be formed.

As the coating method, a dip coating method, a roll coating method, a spray coating method, a gravure coating method, a comma coating method or a die coating method, may, for example, be employed. By these coating methods, continuous processing is possible, and thus the productivity is excellent as compared with a batch system vapor deposition method. In order to increase the adhesive strength between the antireflection film (A) and e.g. the layer (B)

made of a resin having a self-restoring property and a scratch resistant property, it is possible to preliminarily apply corona discharge treatment or active energy ray treatment such as ultraviolet ray treatment, or apply primer treatment, on the surface of e.g. the layer (B) made of a resin having a self-restoring property and a scratch resistant property.

Also in a case where a layer (C1) such as a high refractive index layer, is to be formed between the antireflection film (A) and the layer (B) made of a resin having a self-restoring property and a scratch resistant property, it is possible to preliminarily apply corona discharge treatment or active energy ray treatment such as ultraviolet ray treatment, or apply primer treatment to the respective surfaces.

The filter for PDP of the present invention is capable of improving the color purity of the red color emission of PDP or capable of converting the red color emission of PDP to a desired color, and thus, it is useful for various applications.

It is particularly preferred that the filter for PDP of the present invention is provided with an antireflection optical film having a color correction function, which comprises an antireflection film (A) made of a non-crystalline fluoropolymer and a layer (B) made of a resin having a self-restoring property and a scratch resistant property, wherein at least one of materials constituting the antireflection optical film having a color correction function contains a color correcting agent, since such a filter is excellent in scratch resistance.

Now, the present invention will be described in detail with reference to Examples. However, it should be understood that the present invention is by no means restricted to such specific Examples.

EXAMPLE 1

As a carrier film, a PET film having a thickness of 100 μm and having release treatment applied, was prepared. To a 33% methyl ethyl ketone solution of a thermoplastic urethane resin obtained by chain-extending a prepolymer comprising 47 parts by mass of a polycaprolacton diol (molecular weight: about 1,250), 25.4 parts by mass of dicyclohexylmethane-4,4-diisocyanate and 16.9 parts by mass of isophorone diisocyanate, with 10.7 parts by mass of 1,4-butanediol, colorants (a) VALIFAST RED 3304 (manufactured by Orient Chemical Industries, Ltd.), (b) FD3351 (manufactured by Asahi Denka Kogyo K.K.) and (c) ABS594 (manufactured by Exciton, Inc.) were added for coloration. This solution was cast on the above carrier film and dried by passing it in a oven of 100° C. for 2 minutes, to form a color correcting agent-containing resin layer (C2-1) having a thickness of 1.7 μm. The contents of the colorants in this resin layer (C2-1) were 0.26 part by mass of (a), 0.48 part by mass of (b) and 0.94 part by mass of (c), per 100 parts by mass of the resin.

Then, on the resin layer (C2-1), a thermosetting urethane resin starting material was cast by a reaction bulk casting method to form a thermosetting urethane resin layer (B-1) of 200 μm having a self-restoring property and a scratch resistant property. Namely, the above starting material was cast and thermally set by passing it through an oven which was capable of continuously heating from 120° C. to 140° C., to form a film. Here, the thermosetting urethane resin starting material used, was one disclosed in Example 5 in the above-mentioned JP-A-61-281118. Its self-restoring property was 100 g, its scratch resistance by a scratching method was 100 g, and the scratch resistance by a haze meter method was less than 10%.

Then, on the thermosetting urethane resin layer (B-1), a solution of a non-crystalline fluoropolymer (CYTOP CTL, manufactured by Asahi Glass Company, Limited) was cast and passed through an oven which was capable of continuously heating from 100° C. to 145° C., to form an antireflection film (A-1) of 102 nm. Thus, a film having a construction of carrier film/resin layer/thermosetting urethane resin layer/antireflection film, was obtained. The carrier film was peeled off, and an adhesive was coated on the surface of the resin layer (C2-1) to obtain an antireflection optical film (X-1) having a color correction function, having an adhesive layer (C3-1) having a thickness of 25 μm.

Then, a glass substrate (thickness: 2.5 mm, manufactured by Asahi Glass Company, Limited) (Y-1) provided with an electrically conductive multilayer film (a laminate having a total thickness of 264 nm comprising three layers of silver and four layers of a dielectric) having an electromagnetic wave-shielding function and a near infrared ray-shielding function), and an antireflection film (Z) provided with an adhesive layer (a four-layered structure of adhesive layer/PET/thermosetting urethane resin layer having a self-restoring property and a scratch resistant property/antireflection film, materials of the respective layers being the same as described above, manufactured by Asahi Glass Company, Limited) having a moisture-proof function, were bonded so that the antireflection film (Z) was located on the conductive film side of the glass substrate (Y-1), and on the opposite side, the antireflection optical film (X-1) was bonded, to obtain a film for PDP having a construction of (X-1)/(Y-1)/(Z).

EXAMPLE 2

As a carrier film, a PET film having a thickness of 100 μm and having release treatment applied, was prepared. Then, to the same thermoplastic urethane resin solution as used in Example 1, colorants (a) VALIFAST RED 3304 (manufactured by Orient Chemical Industries, Ltd.) and (b) ABS594 (manufactured by Exciton, Inc.) were added for coloration, and the solution was cast on the carrier film by a casting method and then dried by passing it in a oven of 100° C. for 2 minutes, to form a color correcting agent-containing resin layer (C2-2) having a thickness of 2 μm. The contents of the colorants in the resin layer (C2-2) were 0.31 part by mass of (a) and 0.90 part by mass of (b), per 100 parts by mass of the resin.

Then, on the resin layer (C2-2), the same thermosetting urethane resin starting material as used in Example 1, was cast by a reaction bulk casting method, to form a thermosetting urethane resin layer (B-1) of 200 μm having a self-restoring property and a scratch resistant property. Further, the same non-crystalline fluoropolymer as used in Example 1 was cast thereon by a casting method to form an antireflection film (A-1) having a thickness of 102 nm. The carrier film was peeled off, and the same adhesive as used in Example 1 was coated on the surface of the resin layer (C2-2) to form an adhesive layer (C3-1) having a thickness of 25 μm, to obtain an antireflection optical film (X-2) having a color correction function.

The antireflection optical film (X-2) was bonded to the same glass substrate (Y-1) and antireflection film (Z) as used in Example 1, in the same manner as in Example 1 to obtain a filter for PDP having a construction of (X-2)/(Y-1)/(Z).

EXAMPLE 3

As a carrier film, a PET film having a thickness of 100 μm and having release treatment applied, was prepared. Then, to the same thermoplastic urethane resin solution as used in Example 1, colorants (a) VALIFAST RED 3304 (manufactured by Orient Chemical Industries, Ltd.), (b) VALIFAST YELLOW 3108 (manufactured by Orient Chemical Industries, Ltd.) and (c) ABS594 (manufactured by Exciton, Inc.) were added for coloration, and the solution was cast on the carrier film by a casting method in the same manner as in Example 1 to form a color correcting agent-containing resin layer (C2-3) having a thickness of 2 µm. The contents of the colorants in the resin layer (C2-3) were 0.38 part by mass of (a), 0.12 part by mass of (b) and 1.63 parts by mass of (c), per 100 parts by mass of the resin.

On the resin layer (C2-3), the same thermosetting urethane resin starting material as used in Example 1 was cast by a reaction bulk casting method to form a thermosetting urethane resin layer (B-1) of 200 µm having a self-restoring property and a scratch resistant property. Further, the same non-crystalline fluoropolymer as used in Example 1 was cast thereon by a casting method to form an antireflection film (A-1) having a thickness of 102 nm. The carrier film was peeled off, and then, the same adhesive as used in Example 1 was coated on the surface of the resin layer (C2-3) to form an adhesive layer (C3-1) having a thickness of 25 µm, to obtain an antireflection optical film (X-3) having a color correction function.

Then, the antireflection optical film (X-3) was bonded to a glass substrate (Y-2) provided with a laminated layer (a copper mesh film (line width: 10 µm, line pitch: 300 µm, line thickness: 10 µm) and a near infrared ray absorption film (NIR109: Lintec Corporation) were bonded to one side of the glass substrate by an adhesive so that the copper mesh film was located on the glass substrate side, manufactured by Asahi Glass Company, Limited) having an electromagnetic-shielding function and a near infrared ray-shielding function, so that the film (X-3) was located on the side where no mesh film was present, to obtain a filter for PDP having a construction of (X-3)/(Y-2).

Figure 6:
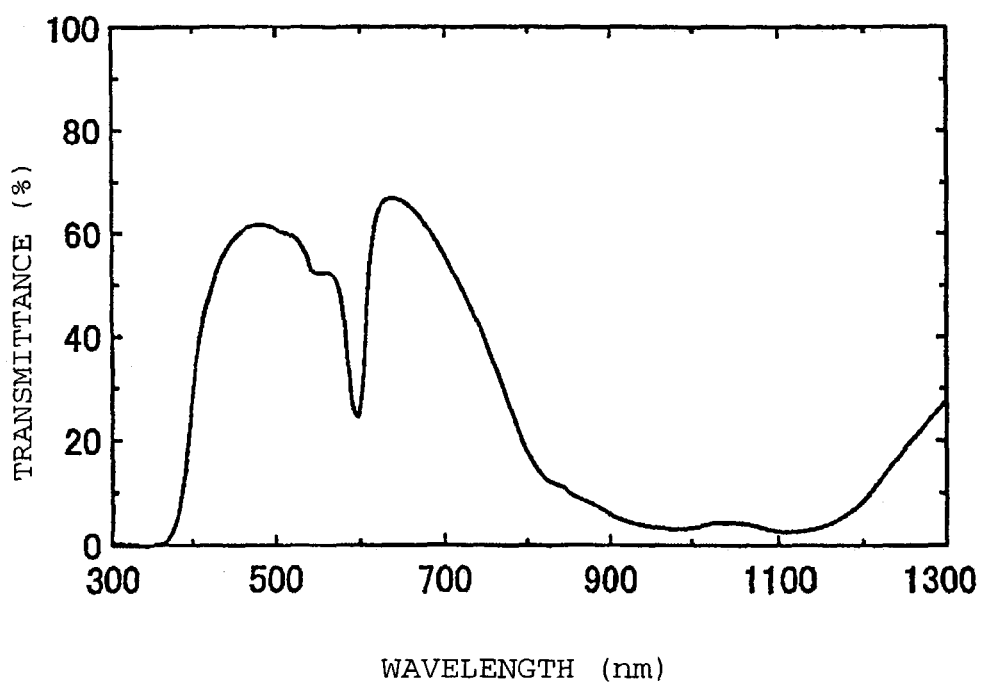
FIG. 6 shows a spectrum of light transmitted through the filter for PDP obtained in Example 3.
Figure 7:
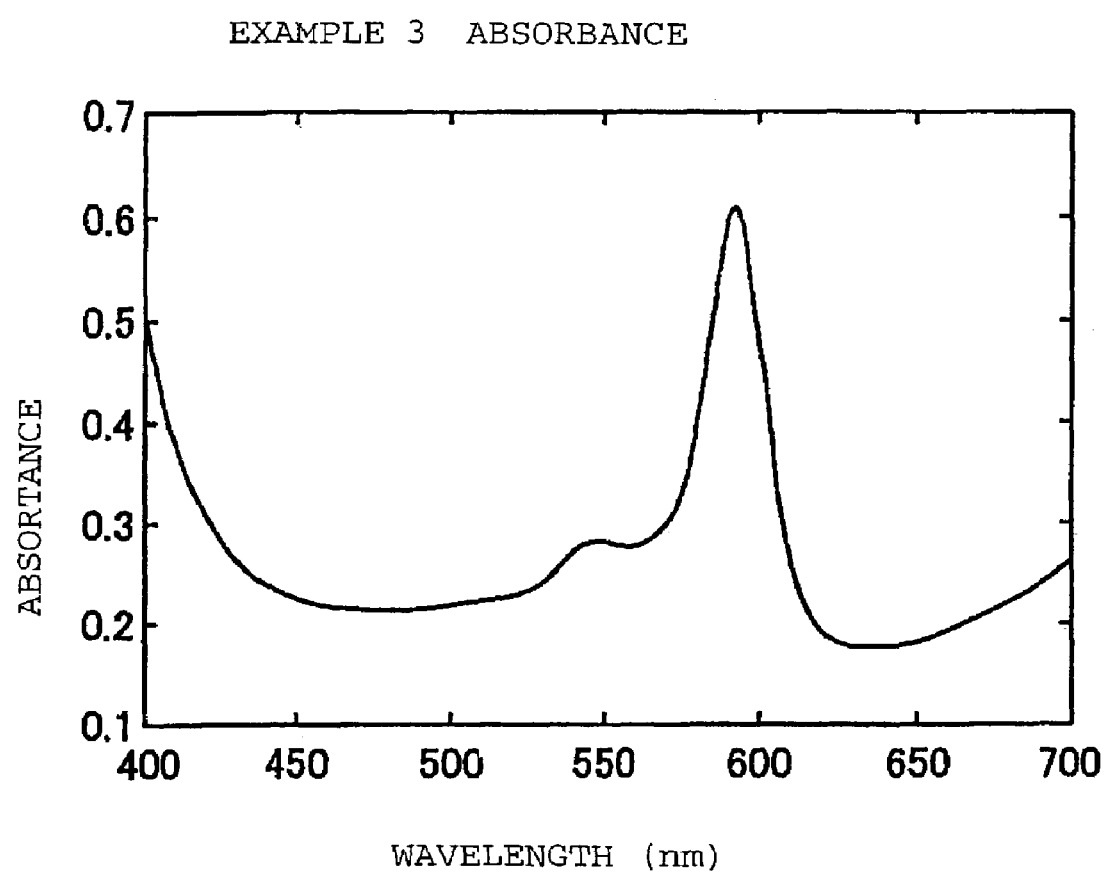
FIG. 7 is a graph showing the absorbance by the filter for PDP obtained in Example 3.

The spectrum of transmitted light through this filter for PDP is shown in FIG. 6, and the absorbance is shown in FIG. 7. These measurements were carried out by an integrating-sphere spectrophotometer.

COMPARATIVE EXAMPLE 1

On a PET film, a color correcting agent-containing resin layer (C2-4) having a thickness of 2 µm was formed in the same manner as in Example 1 by using the same materials as in Example 1 except that instead of three types of colorants in the color correcting agent-containing resin layer in Example 1, only colorant FD3351 (manufactured Asahi Denka Kogyo K.K.) was added so that the content of the colorant became 0.18 part by mass, per 100 parts by mass of the resin.

On this layer (C2-4), the thermosetting urethane resin layer, the fluoropolymer antireflection film and the adhesive layer were formed to have the same layer thicknesses in the same manner by using the same materials as in Example 1, to obtain an antireflection optical film (X-4) having the same construction as in Example 1. This film was bonded to the same glass substrate (Y-1) and antireflection film (Z) as used in Example 1, to obtain a film for PDP having a construction of (X-4)/(Y-1)/(Z).

2. Evaluation of Filters for PDP

Firstly, from commercially available PDP, the attached filter was taken off, and the red color emission spectrum of the main body of PDP was measured by a spectral radiance meter (CS-1000, MINOLTA CO., LTD.). Then, the filters for PDP obtained in Examples 1 to 3 and Comparative Example 1 were mounted on the main bodies of PDP, and the red color emission spectra were measured in the same manner. From the results of the measurements, the positions in the xy chromaticity diagram were obtained in accordance with 4.3 of JIS Z8724-1983.

From the positions on the xy chromaticity diagram before and after passing through the filter, the changes ($\Delta x$ and $\Delta y$) on the xy chromaticity diagram, the change ($\Delta D(rn)$) in distance from the NTSC standard value (point (x, y)=(0.67, 0.33)) and the change ($\Delta D(rc)$) in the distance from the HDTV standard value (point (x, y)=(0.64, 0.33)), were calculated.

The results are shown in Table 1.

It is evident that each of the filters for PDP obtained in Examples 1 to 3 satisfy all of the above formulae (1) to (4) and further satisfy all of the above formulae (1') to (4').

Whereas, the filter for PDP obtained in Comparative Example 1 does not satisfy any one of the above formulae (1) to (4).

Further, based on the measured values in Table 1, an xy chromaticity diagram was prepared (FIG. 1). From FIG. 1, it is evident that the filters for PDP in Examples 1 to 3 improved the color purity of the red color emission of PDP and changed the red color emission of PDP to be closer to the standard values for at least certain distances.

TABLE 1

| | Chromaticity coordinates (red light source) | | Purity of red (distance from NTSC standard value) | Purity of red (Distance from HDTV standard value) |
|---|---|---|---|---|
| | x | y | | |
| Before passing through the filter | 0.6336 | 0.3542 | 0.0437 | 0.0251 |
| Example 1 | 0.6450 | 0.3380 | 0.0262 | 0.0095 |
| Example 2 | 0.6434 | 0.3423 | 0.0293 | 0.0127 |
| Example 3 | 0.6499 | 0.3349 | 0.0207 | 0.0111 |
| Comparative Example 1 | 0.6338 | 0.3536 | 0.0433 | 0.0244 |
| | $\Delta x$ | $\Delta y$ | $\Delta D$ (rn) | $\Delta D$ (rc) |
| Example 1 | 0.0114 | −0.0162 | −0.0175 | −0.0156 |
| Example 2 | 0.0098 | −0.0120 | −0.0145 | −0.0123 |
| Example 3 | 0.0163 | −0.0193 | −0.0230 | −0.0140 |
| Comparative Example 1 | 0.0001 | −0.0006 | −0.0005 | −0.0007 |

As described in the foregoing, the filter for PDP of the present invention is capable of improving the color purity of the red color emission of PDP or capable of changing the red color emission of PDP to be closer to the desired color.

The entire disclosure of Japanese Patent Application No. 2001-131291 filed on Apr. 27, 2001 including specification, claims, drawings and summary are incorporated herein by reference in its entirety.

What is claimed is:

1. A filter for a plasma display panel comprising:
   an antireflection optical film having a colorant; and
   the colorant forming a proportion of the optical film whereby when red light in a visible light range emitted from the plasma display panel is passed therethrough the optical film with the proportion of the colorant, a positional relation of a before passage position and an after passage position in a CIE xy chromaticity diagram of the red light, satisfies at least one of the following formulae (1) and (2) relating to changes in coordinates x,y, and the following formulae (3) and (4) relating to distances from standard values:

formulae relating to coordinates x,y:

$$\Delta x > 0.003 \quad (1)$$

$$\Delta y < 0.003 \quad (2)$$

where $\Delta x$ is the change in coordinate x, and $\Delta y$ is the change in coordinate y, and formulae relating to distances from standard values:

$$\Delta D(rn) < -0.003 \quad (3)$$

$$\Delta D(rc) < -0.003 \quad (4)$$

where $\Delta D(rn)$ is the change in the distance from a point (x, y)=(0.67, 0.33), and $\Delta D(rc)$ is the change in the distance from a point (x, y)=(0.64, 0.33), and $\Delta D(rn)$ and $\Delta D(rc)$ respectively denote that when $\Delta D(rn)$ and $\Delta D(rc)$ take positive values, the distances become long, and when $\Delta D(rn)$ and $\Delta D(rc)$ take negative values, the distance become short.

2. The filter for a plasma display panel according to claim 1, wherein the colorant has a main absorption peak in the visible light range within a range of from 570 to 610 nm.

3. The filler for a plasma display panel according to claim 2, wherein the colorant has a subordinate absorption peak in the visible light range within a range of from 500 to 570 nm.

4. The filer for a plasma display panel according to claim 3, wherein a half-value width of the main absorption peak in an absorbance curve is at most 35 nm.

5. A filter for a plasma display panel comprising:
an antireflection optical film having a colorant, wherein the antireflection optical film comprises an antireflection layer (A) made of a non-crystalline fluoropolymer and a first layer (B) made of a resin having a self-restoring property and a scratch resistant property, and at least one of materials constituting the antireflection optical film includes said colorant;
the colorant forming a proportion of the optical film; and
said optical film with the proportion of the colorant satisfying the following condition:
when a red light in a visible light range emitted from the plasma display panel is passed therethrough the optical film with the proportion of the colorant, a positional relation of a before passage position and an after passage position in a CIE xy chromaticity diagram of the red light, satisfies at least one of the following formulae (1) and (2) relating to changes in coordinates x,y, and the following formulae (3) and (4) relating to distances from standard values:

formulae relating to coordinates x,y:

$$\Delta x > 0.003 \quad (1)$$

$$\Delta y < 0.003 \quad (2)$$

where $\Delta x$ is the change in coordinate x, and $\Delta y$ is the change in coordinate y, formulae relating to distances from standard values:

$$\Delta D(rn) < -0.003 \quad (3)$$

$$\Delta D(rc) < -0.003 \quad (4)$$

where $\Delta D(rn)$ is the change in the distance from a point (x, y)=(0.67, 0.33), and $\Delta D(rc)$ is the change in the distance from a point (x, y)=(0.64, 0.33), and $\Delta D(rn)$ and $\Delta D(rc)$ respectively denote that when $\Delta D(rn)$ and $\Delta D(rc)$ take positive values, the distances become long, and when $\Delta D(rn)$ and $\Delta D(rc)$ take negative values, the distance become short.

6. The filter of a plasma display panel according to claim 5, wherein at least the first layer (B) includes the colorant.

7. The filter for a plasma display panel according to claim 5, wherein in the antireflection optical film, the antireflection layer (A) and the first layer (b) are laminated directly or with a second layer (c 1) having a thickness of at most 10 μm interposed between the antireflection film (A) and the first layer (b).

8. The filter for a plasma display panel according to claim 7, wherein in the antireflection optical film, at least one resin layer (C2) is provided on a side of the first layer (B) where the antireflection film (A) is not present.

9. The filter for a plasma display panel according to claim 8, wherein the at least one resin layer (C2) includes the colorant.

10. The filter for a plasma display panel according to claim 8, further comprising:
an outer layer (C3) of a tackiness or adhesive agent provided as the outermost layer on the side of the first layer (B) where the antireflection film (A) is not present.

11. The filter for a plasma display panel according to claim 10, wherein the at least one resin layer (C2) or the outer layer (C3) includes the colorant.

12. The filter for a plasma display panel according to claim 7, further comprising:
an outer layer (C3) of a tackiness or adhesive agent provided as the outermost layer on a side of the first layer (B) where the antireflection film (A) is not present.

13. The filter for a plasma display panel according to claim 12, wherein the outer layer (C3) includes the colorant.

14. The filter for a plasma display panel according to claim 5, wherein in the antireflection optical film having a color correction function, at least one resin layer (C2) is provided on a side of the first layer (B) where the antireflection film (A) is not present.

15. The filter for a plasma display panel according to claim 14, wherein the at least one resin layer (C2) includes the colorant.

16. The filter for a plasma display panel according to claim 14, further comprising:
an outer layer (C3) of a tackiness or adhesive agent provided as the outermost layer on the side of the first layer (B) where the antireflection film (A) is not present.

17. The filter for a plasma display panel according to claim 16, wherein the at least one resin layer (C2) or the outer layer (C3) includes the colorant.

18. The filter for a plasma display panel according to claim 5, further comprising:
an outer layer (C3) of a tackiness or adhesive agent provided as the outermost layer on a side of the first layer (B) where the antireflection film (A) is not present.

19. The filter for a plasma display panel according to claim 18, wherein the outer layer (C3) includes the colorant.

20. The filter for a plasma display panel according to claim 5, wherein the colorant has a main absorption peak in the visible light range within a range of from 570 to 610 nm.

21. The filter for a plasma display panel according to claim 20, wherein the colorant has a subordinate absorption peak in the visible light range within a range of from 500 to 570 nm.

22. The filter for a plasma display panel according to claim 21, wherein a half-value width of the main absorption peak in an absorbance curve is at most 35 nm.

23. A process for producing the filter for a plasma display panel as defined in claim 5, comprising:
  preparing the first layer (B) made of a resin having a self-restoring property and a scratch resistant property, and
  forming on the surface of the first layer (B) the antireflection film (A) made of a non-crystalline fluoropolymer.

* * * * *